(12) United States Patent
Groessl et al.

(10) Patent No.: US 6,590,962 B1
(45) Date of Patent: Jul. 8, 2003

(54) METHOD OF PERFORMING NON-INTERACTIVE RESISTIVE FAULT LOCATION

(75) Inventors: David J. Groessl, Vernon Hills, IL (US); Kurt E. Schmidt, Burlington, WI (US); Yun Zhang, Wheeling, IL (US)

(73) Assignee: Teradyne, Inc., Boston, MA (US)

( * ) Notice: Subject to any disclaimer, the term of this patent is extended or adjusted under 35 U.S.C. 154(b) by 68 days.

(21) Appl. No.: 09/598,595

(22) Filed: Jun. 21, 2000

(51) Int. Cl.[7] .................... H04M 1/24; H04M 3/08; H04M 3/22

(52) U.S. Cl. ............... 379/14.01; 379/1.01; 379/15.05; 379/22.03; 379/29.03; 324/512; 324/522; 324/525

(58) Field of Search .................. 379/1.01, 14.01, 379/12, 15.05, 22, 22.03, 27.07, 24, 25, 27.01, 29.01, 29.03, 29.04, 29.09, 30; 324/500, 512, 522, 525, 531

(56) References Cited

U.S. PATENT DOCUMENTS

| | | | | |
|---|---|---|---|---|
| 4,278,931 A | * | 7/1981 | Huggins | 324/52 |
| 4,322,677 A | * | 3/1982 | Wright | 324/52 |
| 4,400,663 A | * | 8/1983 | May | 324/52 |
| 4,413,301 A | * | 11/1983 | Middleman et al. | 361/106 |
| 4,424,479 A | * | 1/1984 | Brown | 324/52 |
| 4,475,138 A | * | 10/1984 | Middleman et al. | 361/58 |
| 4,972,453 A | * | 11/1990 | Daniel, III et al. | 379/10 |
| 5,121,420 A | * | 6/1992 | Marr et al. | 379/26 |
| 5,270,661 A | * | 12/1993 | Burnett | 324/527 |
| 5,606,592 A | * | 2/1997 | Galloway et al. | 379/30 |
| 5,699,402 A | * | 12/1997 | Bauer et al. | 379/26 |
| 5,870,451 A | * | 2/1999 | Winkler et al. | 379/26 |
| 5,937,033 A | * | 8/1999 | Bellows | 379/27 |
| 5,953,389 A | * | 9/1999 | Pruett et al. | 379/9 |
| 6,026,145 A | * | 2/2000 | Bauer et al. | 379/26 |
| 6,144,722 A | * | 11/2000 | Anderson et al. | 379/27 |
| 6,356,624 B1 | * | 3/2002 | Apfel et al. | 379/27.01 |

FOREIGN PATENT DOCUMENTS

| | | | | |
|---|---|---|---|---|
| EP | 0-327-191 A1 | * | 9/1989 | G01R/31/08 |
| EP | 0-819-947 A2 | * | 1/1998 | G01R/31/08 |
| EP | 1-126-283 A1 | * | 8/2001 | G01R/31/08 |
| EP | 1-167-986 A2 | * | 2/2002 | G01R/31/08 |

* cited by examiner

*Primary Examiner*—Binh Tieu
(74) *Attorney, Agent, or Firm*—Teradyne Legal Dept.

(57) ABSTRACT

A method and apparatus to non-interactively test telephone networks and more specifically to localize faults such as resistive faults in the subscriber loop of the telephone network is presented. The method and apparatus determine whether the fault is in the tip line or ring line of a phone line. The existence of a fault voltage, if any, is also determined. The resistance of the tip line to ground and the resistance of the ring line to ground is measured. A fault resistance is calculated from this information, from which the location of the fault is determined.

23 Claims, 6 Drawing Sheets

METHOD OF PERFORMING NON-INTERACTIVE RESISTIVE FAULT LOCATION

BACKGROUND OF THE INVENTION

The public switched telephone network is made up of numerous local switching stations called "central offices". The central offices are connected through a network of trunk lines, which carry the signals that represent a telephone call. Lines run from each central office to telephones in the local area around the central office. These lines are called "subscriber lines" because each user of the telephone network is called a subscriber. The trunk lines are "switched," which means that they are not associated with any subscriber. When a call is initiated, required trunk lines are dedicated to carry the call. When the call is finished, the trunk lines are reused to carry another call.

In contrast, each subscriber line has traditionally been dedicated to carrying the signals representing calls associated with a single user. Recently, loop concentrators and other architectural changes in the telephone network have allowed portions of the lines between a central office and some subscribers to be switched. However, there is still some portion of the subscriber line that is dedicated to carrying the calls for each subscriber.

As a result, there are tens of millions of subscriber lines in the US. There are also large numbers of subscriber lines in other countries throughout the world. Maintaining these subscriber lines represents a huge cost for the local telephone operating companies. To facilitate maintenance of subscriber lines, telephone operating companies employ automatic test equipment that can be attached to the network. One prior art product included a measurement unit that could be switched to each subscriber line at a central office. It would then measure the electrical characteristics on the subscriber line and, based on comparisons to expected values, indicate whether the line was faulty. Such a system allowed the telephone company to identify faulty subscriber lines so that a repairperson could be dispatched to repair the faulty line or lines.

Another prior art line test system makes "near end" measurements, which means that it makes its measurements without attaching test equipment at the end of each subscriber line. Rather, the test equipment is located at a central point, thereby keeping the cost of test equipment low. Also, the measurements are generally non-interactive. Non-interactive measurements are made without the need for a person to inject a test signal or attach a test device at the far end of the subscriber line. Near end, non-interactive measurements are the least expensive and therefore the most desirable.

An additional prior art system also makes measurements on subscriber lines. Instead of simply reporting whether a line is faulty, this system gives an indication of where in the subscriber line the fault is located. Important elements of this system are described in U.S. Pat. No. 5,699,402, commonly assigned, which is hereby incorporated by reference.

This fault location information is important because it greatly reduces the cost of repairing the faulty line. Cost is reduced because, with more accurate information about the location of the fault, the right repair person with the right equipment can be sent to repair the fault. Less time is spent finding the fault so that the overall cost of repair is further reduced.

One type of fault that is particularly difficult to localize is a resistive fault. A resistive fault is a fault that can be modeled as an unintended resistive connection between one of the wires that makes up a subscriber line and some other point or points. The resistive connection might be between the two wires, called "tip" and "ring," that make up the subscriber line. The resistive connection might be between either tip or ring and some point that acts as a voltage source. Such faults might be caused by, for example, a cut or weak spot in the insulation around one of the wires.

Resistive faults are usually very difficult to localize using near end techniques. Resistive faults do not present a sharp transition in line impedance and are therefore hard to identify using time domain reflectometry. One possible way to localize a fault is by computing the resistance of the line between the measurement point and the fault. However, there has not heretofore been a suitable way to compute the line resistance because of the number of variables that might influence measurements taken at the near end. For example, the resistance between tip and ring, the resistance between tip or ring and a source of voltage and also the magnitude of that voltage will all influence the near end measurements and will be unknown values.

Because of these difficulties, the traditional way to localize a resistive fault is to use interactive techniques. A repairperson is dispatched and measures characteristics of the line at various points. By comparing measurements at various points, it is possible to tell whether a particular measurement was made before or after the resistive fault. In this way, the fault can be localized. Fault localization done interactively is slow and expensive.

It would be desirable to have a method wherein the number of faults that could be localized as well as the accuracy with which those faults could be localized was increased. In particular, it would be desirable to have a non-interactive technique to locate resistive faults.

SUMMARY OF THE INVENTION

With the foregoing background in mind, it is an object of the present invention to provide a method and apparatus to non-interactively test telephone networks and more specifically to localize faults such as resistive faults in the subscriber loop of the telephone network. The method and apparatus determine whether the fault is in the tip line or ring line of the subscriber loop. The existence of a fault voltage, if any, is also determined. The resistance of the tip line to ground and the resistance of the ring line to ground are measured. A fault resistance is calculated from this information, from which the location of the fault is determined.

BRIEF DESCRIPTION OF THE DRAWINGS

The invention will be better understood by reference to the following more detailed description and accompanying drawings in which.

DESCRIPTION OF THE PREFERRED EMBODIMENT

Figure 1:
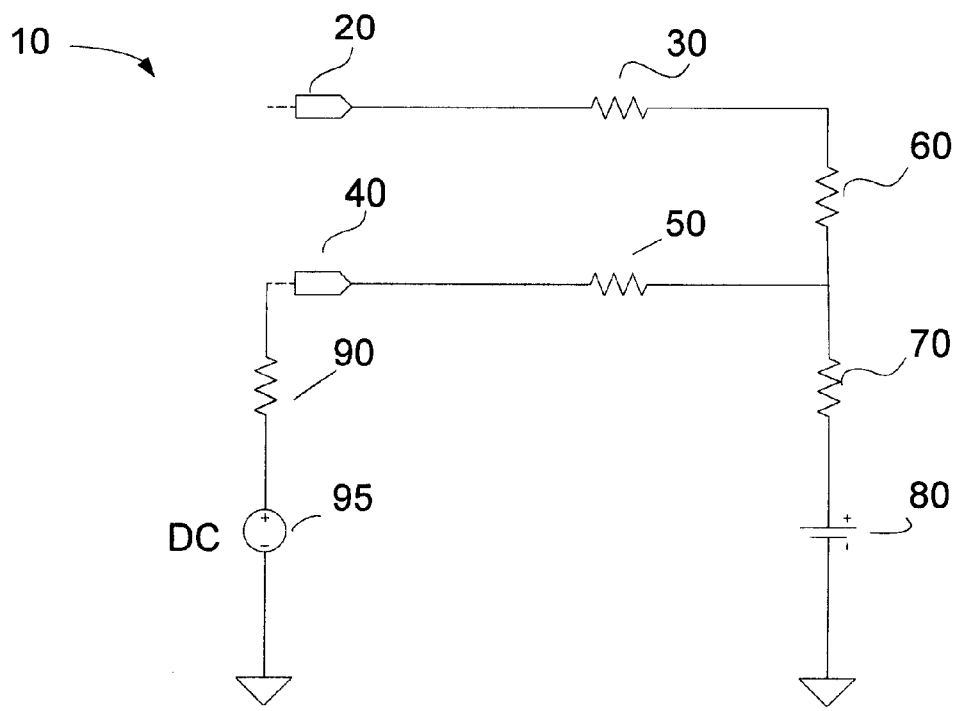
FIG. 1 is a non-interactive resistive fault model.

A resistive fault is a fault that includes an unintended resistive connection between one or both of the tip and ring lines that make up a subscriber phone line. Referring to FIG. 1, a model 10 of a subscriber line including a resistive fault is shown. Line 20 is the tip line from a central office. Line 40 is the ring line from the central office. Resistor 30 ($R_L$) and resistor 50 (also $R_L$) are the tip resistance and ring resistance respectively between the fault location and the central office. Resistor 60 (Rtr) represents the premise termination. The resistive fault is modeled as resistor 70 ($R_f$) and the fault voltage is represented as battery 80 ($V_f$). Thus in this line, there exists a resistive fault between the ring line and ground. In order to identify and locate the fault an adjustable voltage source ($V_s$) 95 having an impedance shown as resistor 90 ($R_s$) is applied to the ring line 40.

$R_L$ can be determined if the ring line voltage ($V_R$) and the voltage (Vx) between $R_L$ and $R_f$ are known by application of the formula:

$$Rl = \frac{(Vr - Vx)Rs}{Vs - Vr} \quad (1)$$

The location of the fault (L in feet) is determined from $R_L$, the wire diameter D, and the wire resistance per unit length (ρ) by application of the following formula:

$$L = 5280 R_L D^2 / \rho \quad (2)$$

Figure 2:
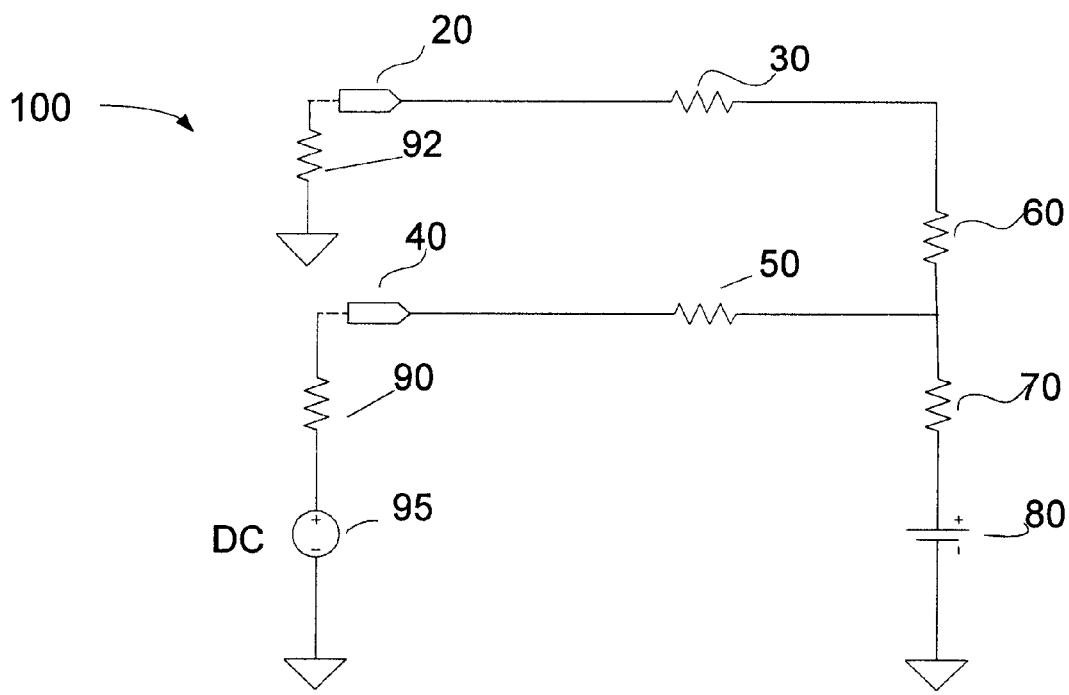
FIG. 2 is a first voltage measurement model.

If the values of $V_R$ and $V_x$ are not known they can be computed. The voltages $V_R$ and $V_x$ can be measured by a voltmeter. There is an error with the measurement due to the finite impedance of the meter. The proper voltage can be extrapolated by two measurements with different meters, the meters having different impedances. Referring now to FIG. 2, a diagram of the $V_x$ measurement model is shown. This circuit is the same as FIG. 1 except for the addition of resistor 90 ($R_{Z1}$) which models the meter impedance. The voltage across the meter is $V_{X1}$ and the voltage between $R_L$ and $R_f$ is $V'_{X1}$. $V'_{X1}$ is related to $V_{X1}$ by the following equation:

$$Vx1 = \frac{V'x1 Rz1}{Rl + Rtr + Rz1} \quad (3)$$

Similarly, a second voltmeter having an impedance $R_{Z2} \neq R_{Z1}$ is utilized. The voltage measured is $V_{X2}$ and $V'_{X2}$ which are related by the following equation $$Vx2 = \frac{V'x2 Rz2}{Rl + Rtr + Rz2} \quad (4)$$

The voltage $V_X$ can be extrapolated from the two measurements according to the formula:

$$Vx = \frac{Vx1 Vx2 (Rz2 - Rz1)}{Rz2 Vx1 - Rz1 Vx2} \quad (5)$$

Figure 3:
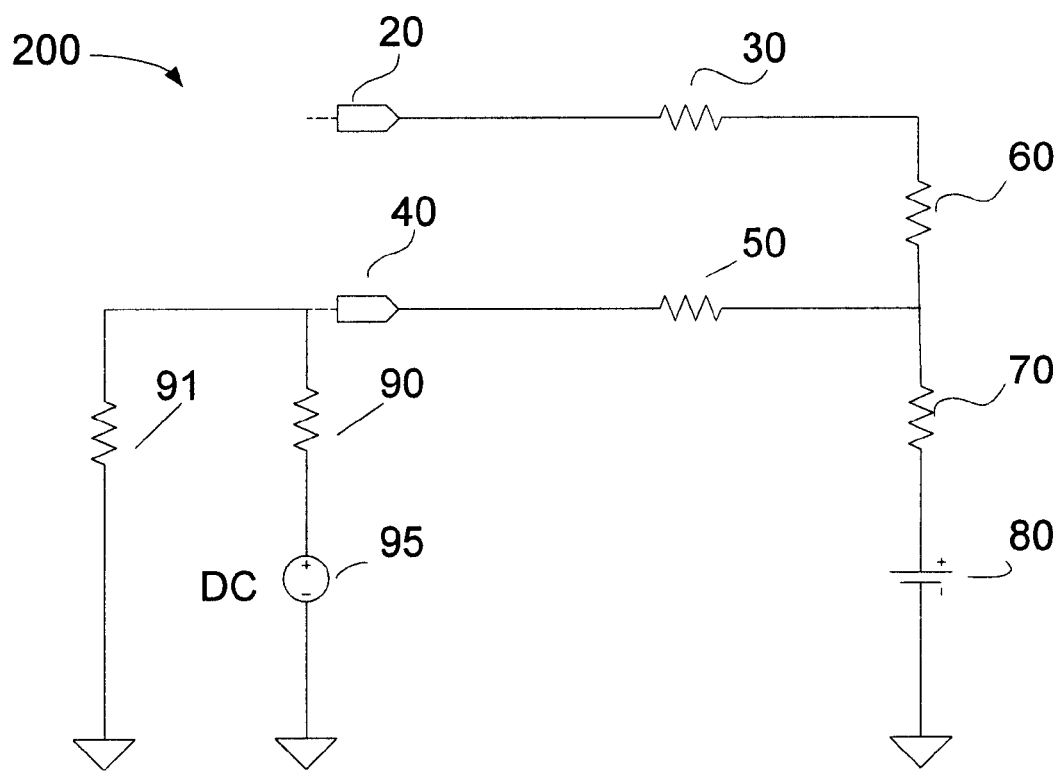
FIG. 3 is a second voltage measurement model.

Referring now to FIG. 3 a similar method is used with the ring line. A meter having an impedance modeled as resistor 91 (R1) is used to obtain a first measurement and, as described above with respect to the tip line, the same measurements are made on the ring line with the two meters having different impedances.

$$Vr = \frac{Vr1 Vr2 (R2 - R1)}{R2 Vr1 - R1 Vr2} \quad (6)$$

The tolerances and inaccuracies of the meters and the voltage drive source affect the results obtained by this method. Optimization was done through simulations to determine the best value of $V_s$ to drive the circuit, and to design the best voltmeters. A total of six parameters can be optimized to reduce errors. These six parameters are the drive voltage $V_s$, the drive voltage impedance $R_s$, and meter impedances $R_1$, $R_2$, $R_{z2}$, and $R_{z1}$. When the same voltmeter is used to measure $V_{R1}$ and $V_{X1}$ and the same voltmeter used to measure $V_{R2}$ and $V_{X2}$ then $R_1 = R_{Z1}$, $R_2 = R_{Z2}$, $\Delta R_1 = \Delta R_{Z1}$, and $\Delta R_2 = \Delta R_{Z2}$ then only four parameters need be optimized.

The optimization of the drive source was intended to find the best drive voltage $V_S$ and source impedance $R_S$ to minimize $\Delta R_L$. Simulations showed that the optimized $V_S$ is a function of fault voltage. The error is smaller when the polarities of the drive voltage and the fault voltage are opposite. Additionally, the simulations showed that zero volts is the optimized drive voltage if a fault voltage exists. Further simulations showed that if the fault voltage is not zero and the drive voltage is zero, then the choice of a smaller $R_S$ decreases the error. Further, the simulations showed that if the fault voltage does not exist it may not be possible to optimize the drive resistance.

The optimization of the meter impedances was intended to find the best meter impedances to minimize the error. The following two equations show that if they hold true, then the error caused by the inaccuracy of the meter impedance is zero.

$$\frac{R2}{R1} = \frac{\Delta R2}{\Delta R1} \quad (7)$$

$$\frac{RZ2}{RZ1} = \frac{\Delta RZ2}{\Delta RZ1} \quad (8)$$

If the ratios are unknown the use of two meters with the same impedance error polarities reduces the error. If the polarities of the impedance error are also unknown then an increase of $R_1$ and $R_{Z1}$ such that $R_1/R_2 > 1$ and $R_{Z1}/R_{Z2} > 1$ reduces the error. The bigger the ratio is, the smaller the error. A ratio of k>1 reduces the error term k times.

From the above, it is recommended that a drive voltage with both polarities and with an accurate zero volt output be employed. When the fault voltage is non-zero, the use of a zero volt drive voltage reduces the error a great deal. If a zero volt output is not available from the drive source then setting the drive voltage to a voltage having an opposite polarity of the fault voltage reduces the error. The use of a smaller drive resistance reduces the error when the fault voltage is non-zero and when a zero volt drive voltage is used.

Figure 4A:
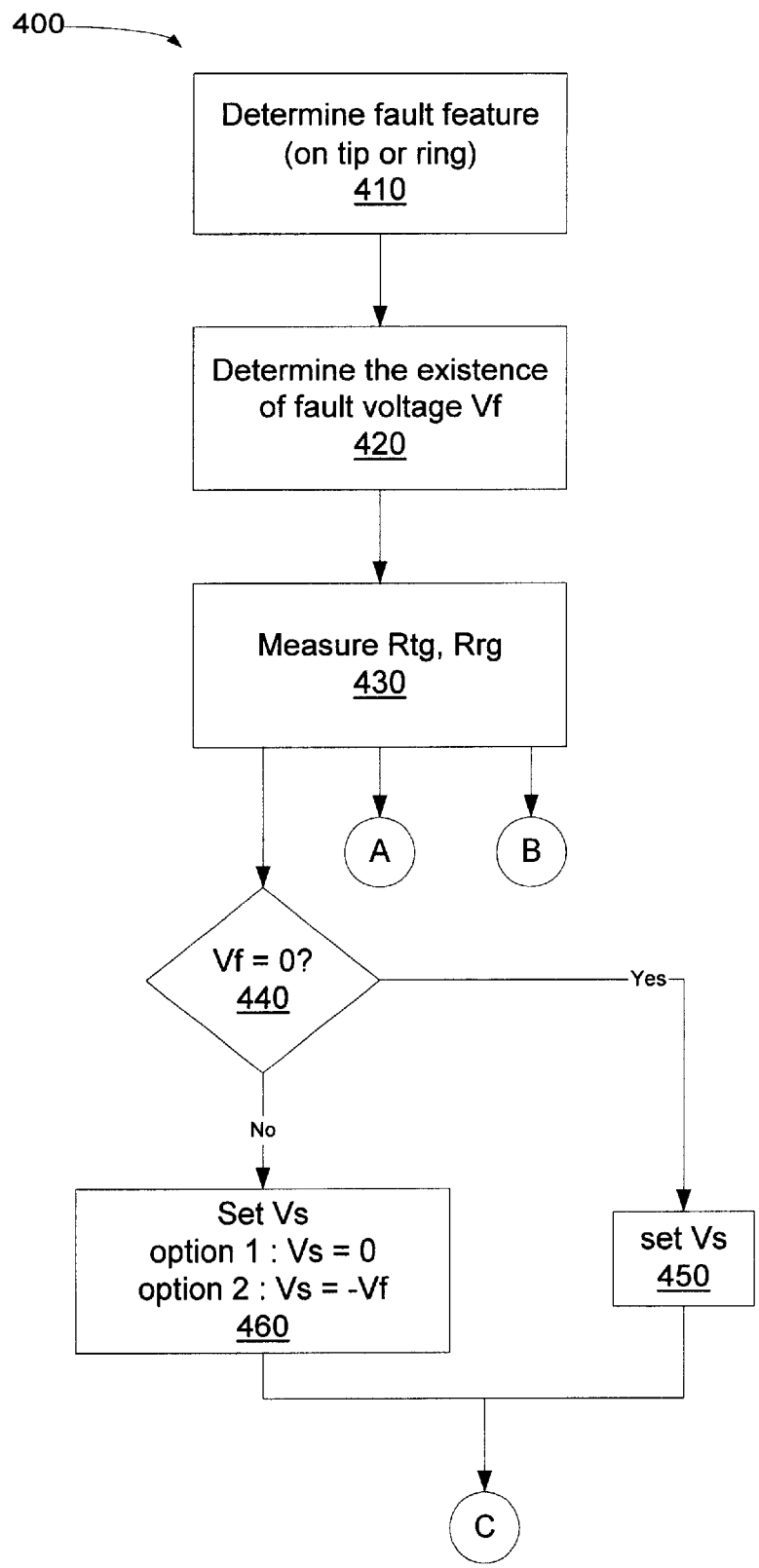
FIG. 4A is a first portion of a flow chart of the present method.
Figure 4B:
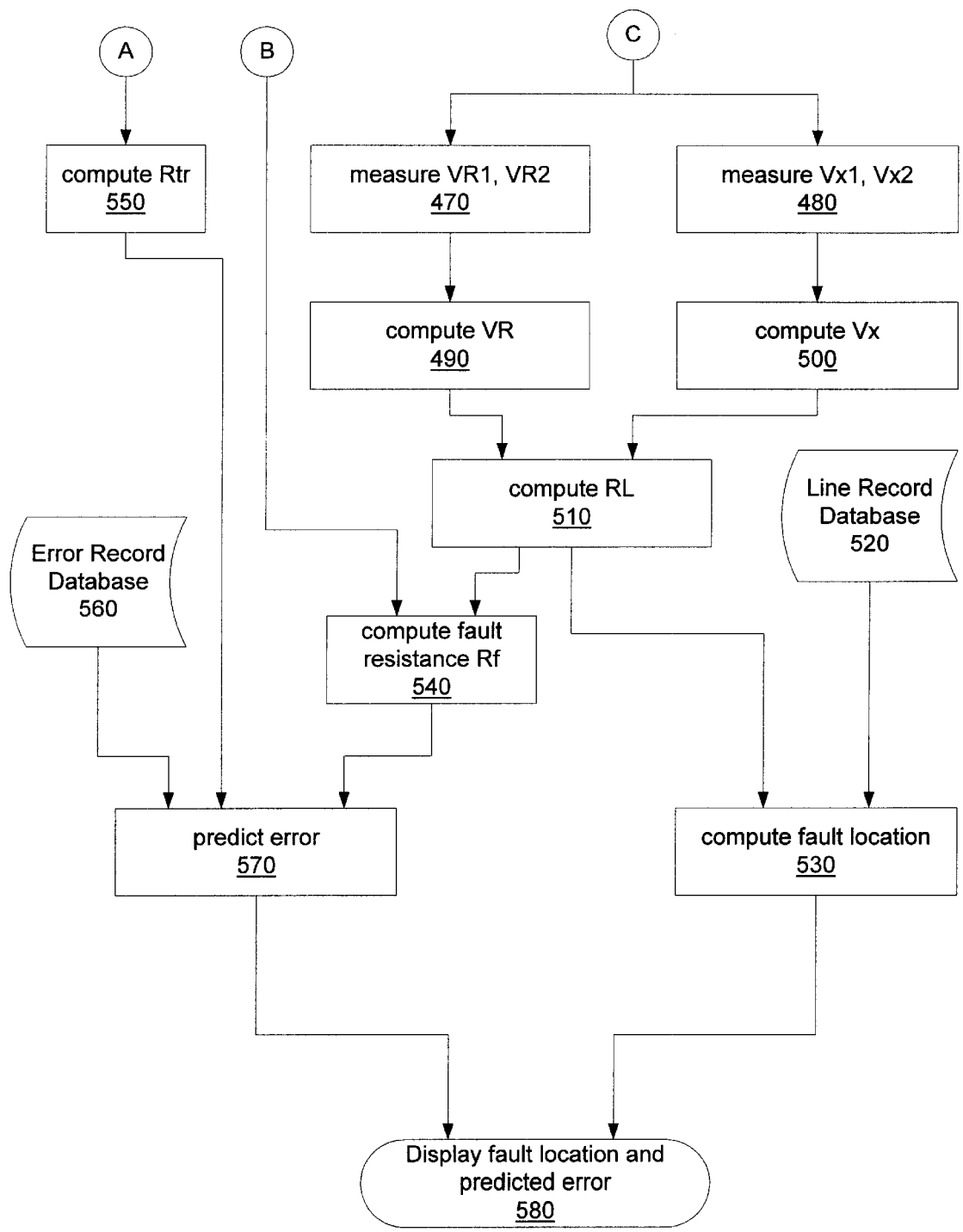
FIG. 4B is a second portion of the flow chart of FIG. 4A.
Figure 5B:
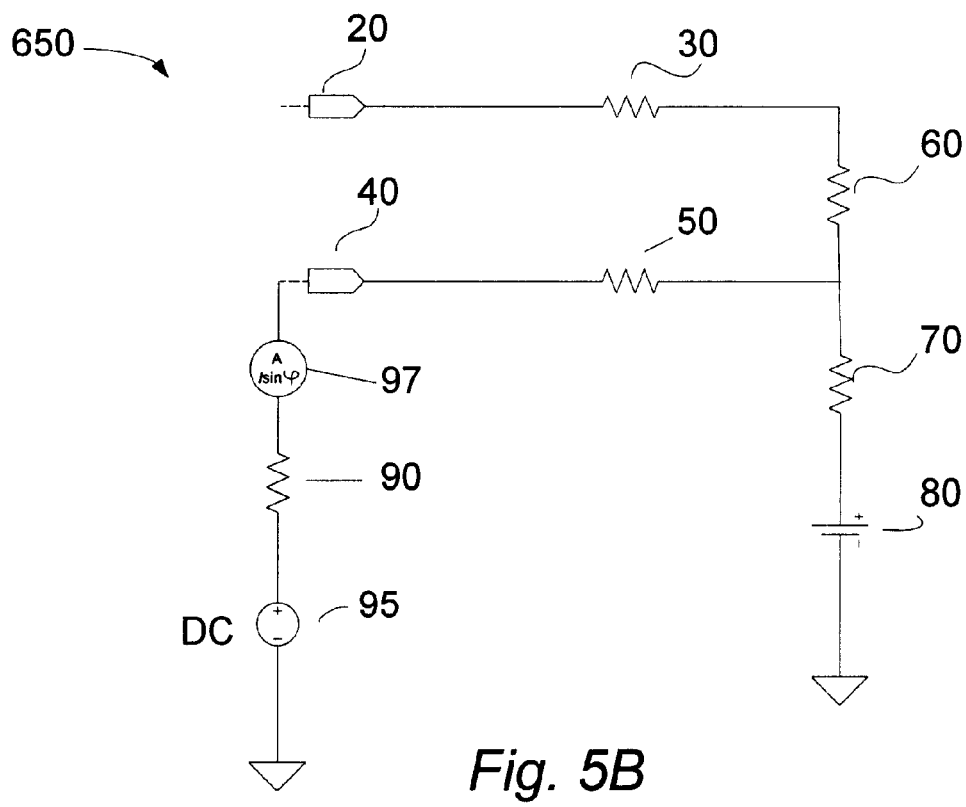
FIG. 5B is a second model for determining tip and ring current.
Figure 5A:
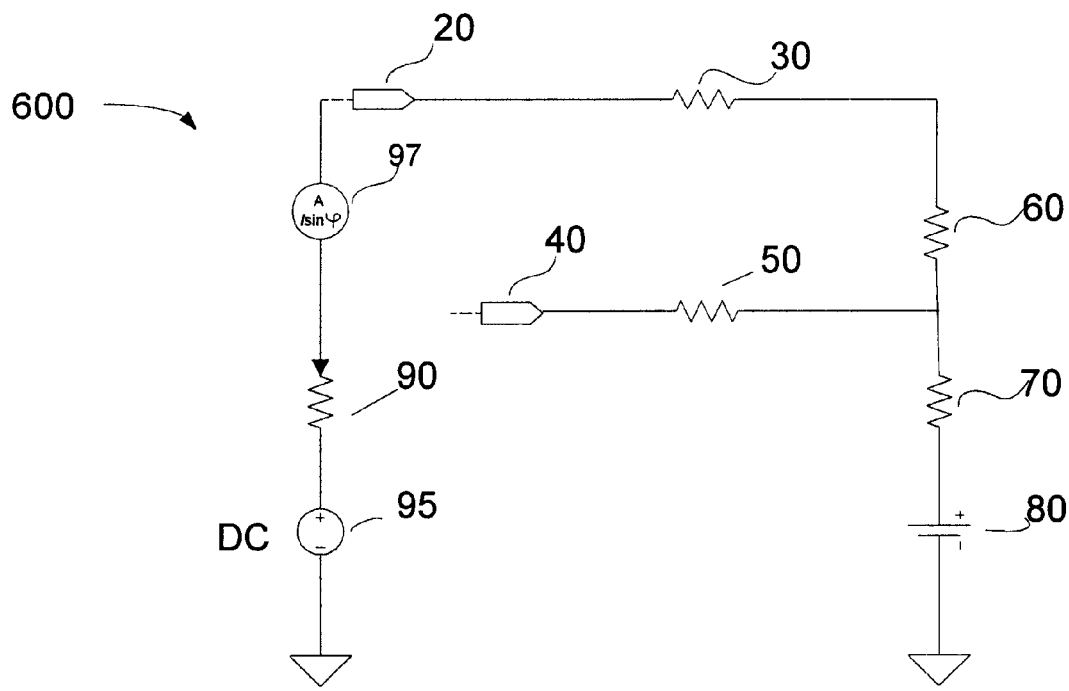
FIG. 5A is a first model for determining tip and ring current.

Referring now to FIGS. 4A and 4B, the method 400 for performing non-interactive resistive fault location is shown. First step 410 comprises determining the fault feature, which is which of the tip or ring line the fault is located on. FIGS. 5A and 5B show how this is determined. The circuit 600 of FIG. 5A shows a model representing the tip 20 and ring 40 lines of a subscriber line. A voltage source $V_{s1}$ 95 is connected to the tip line 20. The current $I_t$ is measured. If $I_t$ is zero then the voltage source is changed to $V_{s2}$ and the current $I_t$ is measured again. As shown in FIG. 5B, a voltage source is connected to the tip line 40. This voltage source is set to the value of either $V_{s1}$ or to the value of $V_{s2}$ if $V_{s1}$ resulted in an $I_t$ of zero. The current $I_R$ is measured and compared to $I_t$. If $I_t$ is greater than $I_r$ the fault resides on the tip line 20, otherwise the fault resides on the ring line 40.

Figure 6:
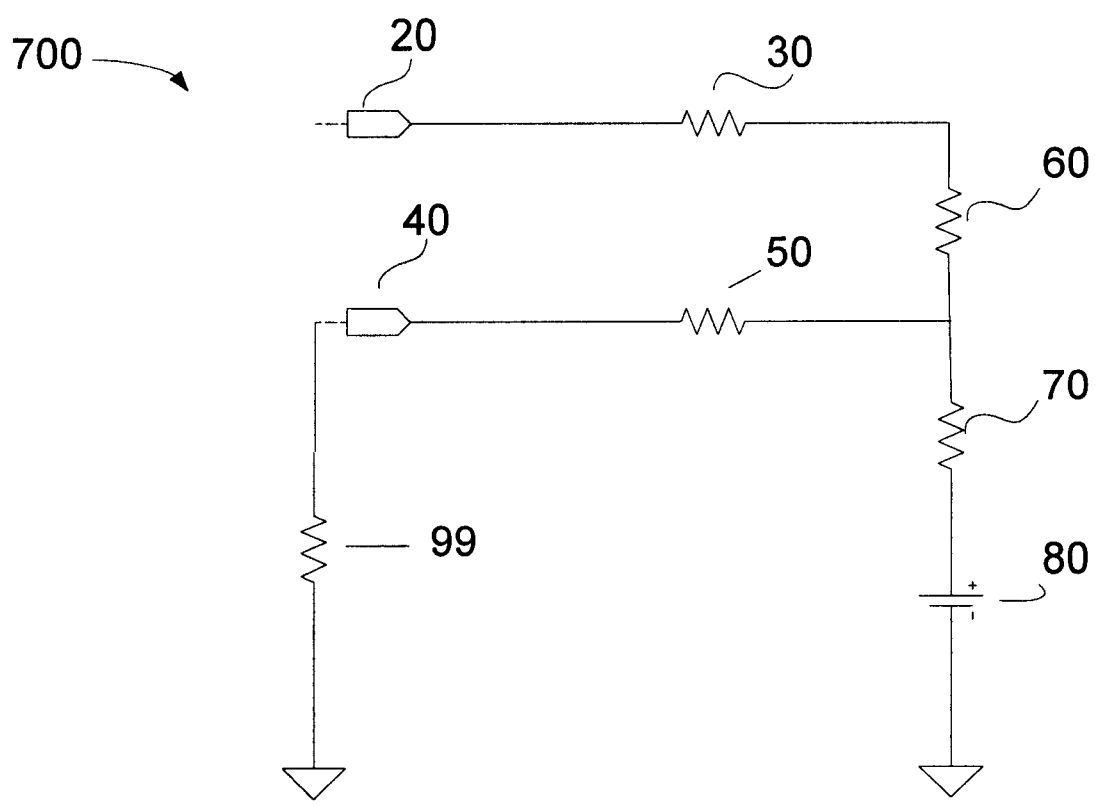
FIG. 6 is a fault voltage measurement model.

Having determined the fault feature, the next step of the method is step 420 wherein a determination is made as to the existence of a fault voltage $V_f$. Circuit 700 of FIG. 6 shows the model for determining the fault voltage. The line having the fault (tip 20 or ring 40) has its line voltage measured. If the measured voltage is zero then the fault voltage Vf does not exist otherwise the fault voltage $V_f$ 80 is connected to the fault resistance $R_f$ 70. Resistor 99 represents the meter resistance. Two measurements with different impedances can be made to achieve an accurate determination of $V_f$.

Following step 420, step 430 is executed. Step 430 involves measuring the resistance from tip to ground and measuring the resistance from ring to ground. These measurements will be used later to determine the error and the location of the fault. Following step 430, three different paths can be taken.

The first path begins with step 440. At step 440 a determination of the fault voltage (described above) is performed. If the fault voltage is zero volts then step 450 is executed which sets the voltage source to a predetermined value. If the fault voltage is non-zero then step 460 is executed. At step 460 the voltage source is set to zero volts or, if zero volts is not available from the voltage source, the voltage source is set to the negative value of the fault voltage.

Following steps 450 or 460 steps 470 and 480 are executed. Step 470 measures the values of $V_{R1}$ and $V_{R2}$. The measurements are described above with reference to FIG. 3. Similarly, step 480 measures the values of $V_{X1}$ and $V_{X2}$, which are described above with respect to FIG. 2.

Step 490 is executed next, and comprises computing the value of $V_R$. The value of $V_R$ is computed according to equation 6. Step 500 comprises computing the value of $V_X$, which is done according to equation 5. Having computed $V_R$ and $V_X$, step 510 is executed. Step 510 computes the value of $R_L$. Equation 1, described above, is used to calculate the value of $R_L$.

Following the computation of $R_L$ the fault resistance $R_F$ is calculated as shown in step 540. The computation of $R_F$ requires $R_L$ and $R_{TG}$ or $R_{RG}$ from step 430. If the fault is on the tip line, then $R_F = R_{RG} - R_L$. If the fault is on the ring line, then $R_F = R_{TG} - R_L$.

Also following the computation of $R_L$ step 530 is executed. At step 530 the fault location is computed. The gauges of the line, the line length and other information relating to the line are stored in line record database 520. The data from the line record database and the value of $R_L$ are used to determine the fault location in accordance with equation 2 described earlier.

Referring back to step 430, another path from this step comprises executing step 550, which computes the value of $R_{TR}$. As described above, $R_{TR}$ is the tip to ring resistance measurements, and the following equations are used to calculate the value of $R_{TR}$.

$$Ir = \frac{Vs - Vf}{Rs + Rl + Rf} \tag{9}$$

$$Rl + Rf = \frac{(Vs - Vf)}{Ir} - Rs \tag{10}$$

$$It = \frac{Vs - Vf}{Rs + Rl + Rtr + Rf} \tag{11}$$

$$Rl + Rtr + Rf = \frac{Vs - Vf}{It} - Rs \tag{12}$$

$$Rtr = (Rl + Rtr + Rf) - (Rl + Rf) \tag{13}$$

The next step performed is step 570, which predicts the error. The error can be predicted in terms of $R_{TR}$ from step 550, in terms of $R_F$ from step 540 and from an error record database 560. If the fault voltage $V_F$ exists then $R_F$ is not needed because the error is independent of the fault resistance. The error record database may be a look-up table or an expert system including all of the errors that can be modified.

At step 580 the fault location and the predicted error are displayed.

The above-described method provides a manner to non-interactively test telephone networks and more specifically to localize faults such as resistive faults in the subscriber loop of the telephone network. The method and apparatus determine whether the fault is in the tip line or ring line of a phone line. The existence of a fault voltage, if any, is also determined. The resistance of the tip line to ground and the resistance of the ring line to ground are measured. A fault resistance is calculated from this information, from which the location of the fault is determined.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

What is claimed is:

1. A method of performing non-interactive resistive fault location identification comprising:

connecting a phone line to a test unit, said phone line having a tip line and a ring line;

determining whether the phone line has a resistive fault;

determining the presence of a fault voltage;

computing the resistance of a selected one of the tip line and the ring line between the unit and the fault using the determined fault voltage;

using the computed resistance to determine the length of the selected one of the tip line and the ring line between the test unit and the resistive fault.

2. The method of claim 1 wherein determining whether the phone line has a resistive fault comprises determining if said fault is on said tip line or on said ring line and the selected one of the tip and ring line is the line containing the fault.

3. The method of claim 2 wherein said step of determining if said fault is on said tip line or said ring line comprises:

connecting a voltage source providing a first voltage value to said tip line;

measuring a first current value of said tip line;

connecting a voltage source providing a second voltage value to said tip line and measuring a second current value of said tip line when said first current value of said tip line equals approximately zero;

connecting a voltage source providing a first voltage value to said ring line when said first current value of said tip line is non-zero and connecting a voltage source providing a second voltage value to said ring line when said first current value of said tip line is zero;

measuring a first current value of said ring line;

determining that a fault is on said tip line when either said first current value of said tip line or said second current value of said tip line is greater than said first current value of said ring line; and determining that said fault is on said ring line when said first current value of said ring line is greater than either said first current value of said tip line or said second current value of said tip line.

4. The method of claim 3 wherein the step of determining the existence of a fault voltage comprises measuring the voltage between the line having the fault and ground.

5. The method of claim 3 wherein said step of computing a resistance between said tip line and said ring line comprises the steps of:

subtracting the fault voltage from a source voltage to obtain a voltage differential;

subtracting the current value of the ring line from the current value of the tip line to obtain a current differential; and dividing said voltage differential by said current differential.

6. The method of claim 1 further comprising predicting an error based on at least one of said resistance between said tip line and said ring line and an error record database.

7. The method of claim 6 wherein said error record database comprises at least one of a look up table and an expert system.

8. A method of performing non-interactive resistive fault location identification comprising:

selecting a phone line, said phone line having a tip line and a ring line;

determining which of the tip line and the ring line contains a resistive fault;

determining the magnitude of a fault voltage;

applying a voltage to the line containing the resistive fault and measuring the current to thereby determine a line resistance using the determined magnitude of a fault voltage;

computing a fault location from the measured line resistance.

9. The method of claim 8 wherein said step of determining a fault feature comprises determining if said fault is on the tip line or on the ring line.

10. The method of claim 8 wherein said step of determining if said fault is on the tip line or on the ring line comprises:

connecting a voltage source providing a first voltage value to said tip line;

measuring a first current value of said tip line;

connecting a voltage source providing a second voltage value to said tip line and measuring a second current value of said tip line when said first current value of said tip line equals approximately zero;

connecting a voltage source providing a first voltage value to said ring line when said first current value of said tip line is non-zero and connecting a voltage source providing a second voltage value to said ring line when said first current value of said tip line is zero;

measuring a first current value of said ring line;

determining that a fault is on said tip line when either said first current value of said tip line or said second current value of said tip line is greater than said first current value of said ring line; and determining that said fault is on said ring line when said first current value of said ring line is greater than either said first current value of said tip line or said second current value of said tip line.

11. The method of claim 10 wherein determining the existence of a fault voltage comprises measuring the voltage between the line having the fault and ground.

12. The method of claim 8 wherein said step of computing a fault resistance comprises:

determining the resistance between ground and the line not having a fault;

determining the line resistance from a central office to the fault; and subtracting the line resistance from the central office to the fault from the resistance between ground and the line not having the fault.

13. The method of claim 8 wherein said step of predicting an error comprises predicting the error based on said resistance between said tip line and said ring line.

14. A method of performing non-interactive resistive fault location identification comprising the steps of:

selecting a phone line having a tip line and a ring line;

determining a fault feature;

determining the presence of a fault voltage;

measuring a resistance from a tip line to ground and from a ring line to ground;

determining the value of the fault voltage;

setting a source voltage to a predetermined value when said fault voltage is equal to approximately zero volts;

setting the source voltage to a value selected from the group consisting of approximately zero volts and the negative value of the fault voltage when said fault voltage is non-zero;

measuring a first ring voltage with a meter having a first impedance;

measuring a second ring voltage with a meter having a second impedance;

determining a final ring voltage from said first ring voltage and said second ring voltage;

measuring a first tip voltage with a meter having a third impedance;

measuring a second tip voltage with a meter having a fourth impedance;

determining a final tip voltage from said first tip voltage and said second tip voltage;

determining the tip resistance and ring resistance between the fault location and the central office from said final ring voltage and said final tip voltage;

computing a fault resistance from said the tip resistance and ring resistance between the fault location and the central office;

predicting an error from said fault resistance;

computing a fault location from said the tip resistance and ring resistance between the fault location and the central office; and providing said fault location and said error.

15. The method of claim 14 wherein said step of determining a fault feature comprises determining if said fault is on the tip line or on the ring line.

16. The method of claim 15 wherein said step of determining if said fault is on the tip line or on the ring line comprises the steps of:

connecting a voltage source providing a first voltage value to said tip line;

measuring a first current value of said tip line;

connecting a voltage source providing a second voltage value to said tip line and measuring a second current value of said tip line when said first current value of said tip line equals approximately zero;

connecting a voltage source providing a first voltage value to said ring line when said first current value of said tip line is non-zero and connecting a voltage source providing a second voltage value to said ring line when said first current value of said tip line is zero;

measuring a first current value of said ring line;

determining that a fault is on said tip line when either said first current value of said tip line or said second current value of said tip line is greater than said first current value of said ring line; and determining that said fault is on said ring line when said first current value of said ring line is greater than either said first current value of said tip line or said second current value of said tip line.

17. The method of claim 14 wherein the step of determining the existence of a fault voltage comprises the step of measuring the voltage between the line having the fault and ground.

18. The method of claim 14 wherein said step of determining a final ring voltage comprises the steps of:

obtaining a first value by subtracting said first impedance from said second impedance;

obtaining a second value by multiplying said first ring voltage by said second ring voltage;

obtaining a third value by multiplying said second ring voltage by said first impedance;

obtaining a fourth value by multiplying said second impedance by said first ring voltage;

obtaining a fifth value by multiplying said first value by said second value;

obtaining a sixth value by subtracting said third value from said fourth value; and obtaining said final ring voltage by dividing said fifth value by said sixth value.

19. The method of claim 14 wherein said step of determining a final tip voltage comprises the steps of:

obtaining a first value by subtracting said third impedance from said fourth impedance;

obtaining a second value by multiplying said first tip voltage by said tip ring voltage;

obtaining a third value by multiplying said second tip voltage by said third impedance;

obtaining a fourth value by multiplying said fourth impedance by said first tip voltage;

obtaining a fifth value by multiplying said first value by said second value;

obtaining a sixth value by subtracting said third value from said fourth value; and obtaining said final tip voltage by dividing said fifth value by said sixth value.

20. The method of claim 14 wherein said step of determining the tip resistance and ring resistance between the fault location and the central office from said final ring voltage and said final tip voltage comprises the steps of:

obtaining a first value by subtracting said final tip voltage from said final ring voltage;

obtaining a second value by subtracting said ring voltage from a source voltage;

obtaining a third value by multiplying a source impedance by said first value; and obtaining a final value by dividing said third value by said second value.

21. The method of claim 14 wherein said step of computing a fault location comprises computing the fault location L according to the formula $$L = 5280 R_L D^2 / \rho$$

where

L=the fault location in feet, $R_L$=the tip resistance and ring resistance between the fault location and the central office, D=the wire diameter of said tip line and said ring line, and $\rho$=the wire resistance per unit length.

22. The method of claim 14 wherein said step of computing a fault resistance comprises computing said fault resistance from said tip resistance and ring resistance between the fault location and the central office.

23. The method of claim 22 wherein said step of predicting an error comprises predicting an error from said fault resistance.

* * * * *